A. P. SOUTHWICK,
Assignor, by mesne assignments, to THE UNITED STATES EQUITABLE GAS COMPANY.
MANUFACTURE OF ILLUMINATING GAS.
No. 10,490. Reissued June 17, 1884.
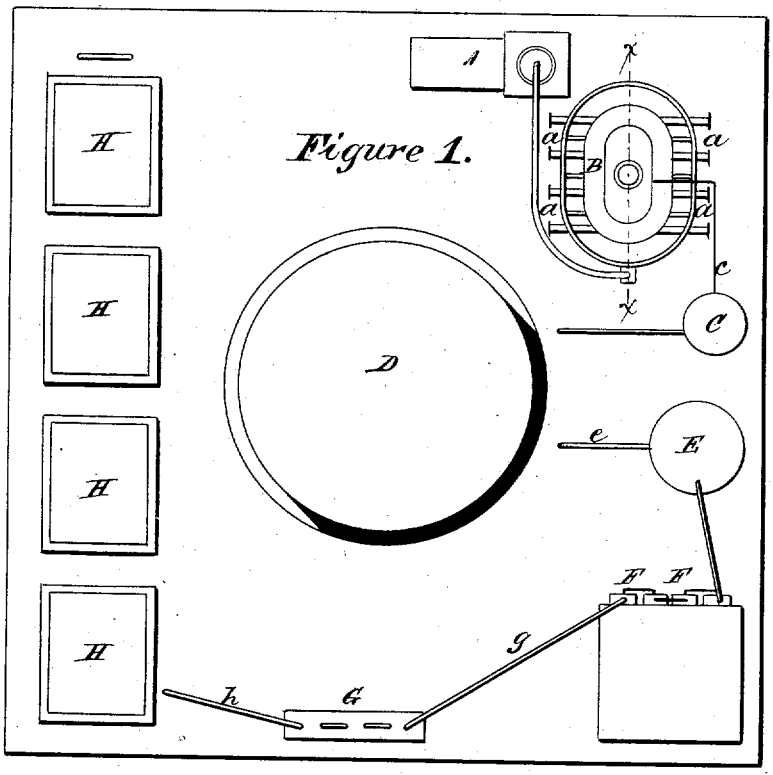
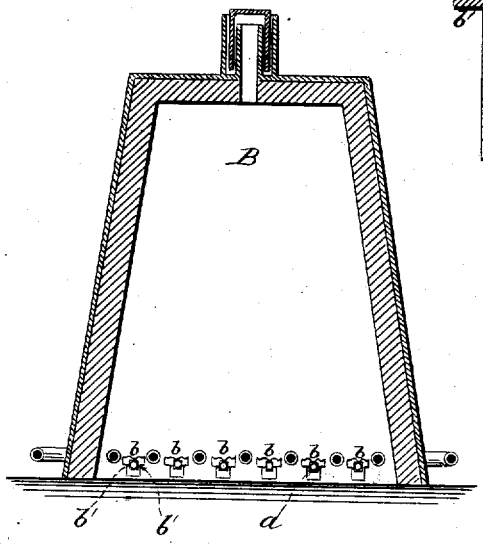
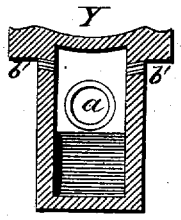
Witnesses:
Geo. H. Evans
H. C. Fansmann.
Inventor:
Alfred P. Southwick
by his attorney
Foster & Freeman
Atty
N. PETERS, Photo-Lithographer, Washington, D. C.

UNITED STATES PATENT OFFICE.

ALFRED P. SOUTHWICK, OF BUFFALO, NEW YORK, ASSIGNOR, BY MESNE ASSIGNMENTS, TO THE UNITED STATES EQUITABLE GAS COMPANY.

MANUFACTURE OF ILLUMINATING-GAS.

SPECIFICATION forming part of Reissued Letters Patent No. 10,490, dated June 17, 1884.

Original No. 142,289, dated August 26, 1873; Reissue No. 8,567, dated February 4, 1879. Application for reissue filed March 22, 1884.

*To all whom it may concern:*

Be it known that I, ALFRED P. SOUTHWICK, of the city of Buffalo, in the county of Erie and State of New York, have invented certain new and useful Improvements in the Manufacture of Illuminating-Gas; and I do hereby declare the following to be a full, clear, and exact description of the same, reference being had to the accompanying drawings, making part of this specification, in which—

Figure 1 is a plan view of the entire apparatus. Fig. 2 is a vertical longitudinal section through the decomposing-cupola on line X X, Fig. 1. Y shows an enlarged view of the grate-bar.

The object of my invention is, first, to simplify the apparatus for the manufacture of illuminating-gas from superheated steam; and, second, to remove all the impurities from the gas and retain all of the inflammable gases generated from the materials used; and the invention consists, first, in the combination and peculiar relative arrangement shown of the boiler, the decomposing-cupola, the governing-holder, the carbureting apparatus, and the cold-lime purifiers; second, in the manufacture of carbureted water-gas by alternately passing superheated steam and atmospheric air through incandescent carbon contained in the decomposing-cupola, the gas made from the former being conducted into the governing-holder, from which it is forced through the carbureting-vessel and fixing-retorts, and finally through the purifiers charged with hydrate of lime, and the latter passing through the fire and out through a previously-opened passage into the atmosphere for the purpose of bringing the fire to the necessary intensity for properly decomposing the succeeding jets of superheated steam.

In the manufacture of carbureted water-gas it has heretofore been considered essential to remove all of the carbonic oxide contained therein (amounting to from thirty to forty per cent.) by converting it into carbonic-acid gas, and then removing the result of this conversion, (carbonic-acid gas,) which is a practical impossibility.

In view of this fact, and the additional fact that about forty per cent. of carbonic oxide in carbureted-hydrogen gas adds to the candle-light power of the gas instead of deteriorating therefrom, the object of my invention is to generate the minimum percentage of carbonic-acid gas and the maximum percentage of inflammable gases, to retain all of the latter, including the carbonic oxide, and freeing it after carburation of all the impurities, including carbonic acid, of which there are from two to four per cent. sulphureted hydrogen, the quantity of which will vary with the quality of coal used in the decomposing-cupola, and all of the free atoms of tar carried through the washers. This I accomplish by conducting the gases, after they have been carbureted and washed, through purifiers charged with hydrate of lime.

Like letters of reference designate like parts in each of the figures.

A is a steam-boiler of ordinary construction, in which the steam is generated.

B is the decomposing-cupola, having one or more hollow grate-bars, *b b*, into which the steam from the boiler is conducted through pipes *a a*.

*b′ b′* are small holes, through which the superheated steam passes from the superheating grate-bars into and through the body of incandescent carbon, by which it is decomposed. The oxygen in the steam, uniting with the carbon of the coal, sets the hydrogen free.

C is a condenser, into which the gases are conducted from the decomposing-cupola through a pipe, *c*.

D is a small gas-holder or governing-reservoir, into which the gas is conducted, and from which it passes through a pipe, *e*, into the carburetor E, consisting of a shell or vessel containing shelves or shallow pans filled with liquid hydrocarbon. The gas, in passing over these pans, takes up and carries off the carbon vapor suspended over these pans into and through one or more hot retorts, F F, in which the gas is fixed. It is next conducted through a pipe, *g*, into and through the washer G, which is of ordinary construction. The composition of the gas is now found to be carbureted hydrogen, carbonic-acid gas, carbonic oxide, sulphureted hydrogen, free carbon or tar, and minute traces of other chemical combinations incident to all illuminating-gases. This combination of gases is now conducted through a pipe, *h*, into and through one or more purifiers, H H, charged with hydrate of lime, by which the gas is freed of all its impurities, leaving only carbureted hydrogen and carbonic oxide, both of which are inflammable, to be carried to the distributing-holder.

The passage of the superheated steam through the incandescent carbon (coal) in the decomposing-cupola has the effect to deaden or extinguish the fire, and then, being another means of keeping it alive, it becomes necessary to allow a current of atmospheric air to pass through it. This I accomplish by occasionally closing the communication between the boiler and the decomposing-cupola and between the decomposing-cupola and the condenser, also opening a passage to the atmosphere from the upper portion of the cupola, and allowing a flow of atmospheric air to enter beneath the grate-bars and pass up through the body of the fire. By this means the fire is again brought to the necessary intensity. During this operation the governing-holder D performs its important office of keeping up the carburation and purification of the gas contained therein, it being of sufficient weight to keep a constant flow of gas through the carbureting apparatus and the purifiers.

The ends of the hollow grate-bars *b* are cast only partially closed, steam being admitted thereto through the upper half, the lower half being stopped off, so as to form a trough, wherein the water formed by the condensation of steam can accumulate and be vaporized.

Having thus described my invention, what I claim as my invention, and desire to secure by Letters Patent, is—

The combination of the steam-boiler A, decomposing-cupola B, governing-holder D, carbureting apparatus E F F, and the purifiers H H, all being arranged substantially as described, and for the purposes set forth.

ALFRED P. SOUTHWICK.

Witnesses:

GEO. H. EVANS,

WM. A. POLLOCK.